United States Patent [19]
Chen et al.

[11] 3,886,066
[45] May 27, 1975

[54] TANNIN TREATMENT FOR NON-POROUS SEMIPERMEABLE MEMBRANES

[75] Inventors: Carl Chen, Newark; James Barry Ganci, Wilmington, both of Del.

[73] Assignee: E. I. du Pont de Nemours & Company, Wilmington, Del.

[22] Filed: Nov. 6, 1972

[21] Appl. No.: 303,780

[52] U.S. Cl.............. 210/23; 210/321; 210/500 M
[51] Int. Cl............................................. B01d 13/00
[58] Field of Search ............... 210/23, 321, 22, 500

[56] References Cited
UNITED STATES PATENTS

| | | | |
|---|---|---|---|
| 1,057,823 | 4/1913 | Grenet | 210/500 X |
| 3,422,008 | 1/1969 | McLain | 210/321 |
| 3,524,546 | 8/1970 | Hoeha et al. | 210/500 X |
| 3,567,632 | 3/1971 | Richter et al. | 210/23 |
| 3,615,024 | 10/1971 | Micheals | 210/500 M |
| 3,660,281 | 5/1972 | Tober | 210/23 |
| 3,743,597 | 7/1973 | Credali | 210/23 |
| 3,775,308 | 11/1973 | Yasuda | 210/500 M |

*Primary Examiner*—Frank A. Spear, Jr.

[57] ABSTRACT

Semipermeable membranes having permanently reduced solute passage under reverse osmosis conditions are obtained by contacting non-porous semipermeable membranes with solutions of hydrolyzable tannins.

16 Claims, No Drawings

TANNIN TREATMENT FOR NON-POROUS SEMIPERMEABLE MEMBRANES

BACKGROUND OF THE INVENTION

1. Field of the Invention

This invention relates to improved semipermeable membranes for separating the components of aqueous compositions. More specifically, this invention is directed to separation processes employing non-porous semipermeable membranes which have been treated by contacting such membranes with solutions of hydrolyzable tannins.

2. Description of the Prior Art

Permselective separation processes such as dialysis, ultra-filtration, and reverse osmosis are known for use in the separation of impurities from aqueous mixtures. Recent development of improved membranes in film, coating, and hollow fiber form and of improved apparatus employing these membranes have made such processes practical and economically attractive. These improved membranes and devices are being used particularly for reverse osmosis separations in which a membrane preferentially rejects a dissociated salt, such as sodium chloride, sodium sulfate, or calcium chloride, from an aqueous solution while water passes through the membrane, counter to the normal direction of osmotic flow, under the influence of a pressure greater than the osmotic pressure of the solution.

Among the recently developed improved permselective membranes are those described in U.S. Pat. No. 3,567,632 which are prepared from synthetic organic nitrogen-linked aromatic polymers which contain pendant ionic sulfonic acid groups in amounts up to about one such group per 500 molecular weight units in the polymer.

Other recently developed improved permselective membranes are those described by Quentin in German Offenlegungsschrift No. 20 21 382 which consists essentially of sulfonation products of a group of polyarylenepolyether polysulfones described along with methods for their preparation in British Pat. No. 1,078,234; and those membranes described by Kimura in Industrial and Engg. Chemistry Product Research and Development 10, pages 335 to 339 (1971) which are made of sulfonated poly-(phenylene ethers).

It is well known that complete separation of the more permeable from the less permeable components of liquid mixtures is never obtained with permselective membranes in practical use. All components of a mixture permeate to some degree through any membrane which has a commercially practical permeation flux rate for the more permeable components. In general, membranes of any particular type can be prepared with a range of flux rates, the membranes having higher flux rates and correspondingly lower rejection efficiencies for the less permeable components. A principal goal in the art has been the production of such membranes with more economically attractive optimum balances of high flux rates for more permeable components and higher rejection efficiencies for less permeable components of liquid mixtures than can be obtained by the art-recognized methods for preparing such membranes.

The solute rejection efficiency of permselective membranes is conveniently expressed in terms of the percentage of the solute in the feed mixture which is passed by the membrane. In the reverse osmosis desalination of brackish and saline waters, the solute rejection efficiency can be expressed in terms of salt passage, the percentage of the salt in the feed solution which is passed by the membrane, calculated by the equation Percent salt passage=(salt concentration in permeate/salt concentration in feed)×100

The flux rates of permselective membranes are conveniently expressed in terms of the quantity of a component of the feed mixture which permeates in a given time through a membrane of a given size under specified conditions. For practically useful reverse osmosis membranes, the water flux rate can be defined as the number of gallons of water passing through one square foot of membrane surface per day with a specified aqueous solution, applied pressure, and fraction of the feed passing through the membrane. The effective membrane surface area is the total area of the membrane exposed to the feed mixture under pressure.

It is an object of this invention to provide treatments for non-porous semipermeable membranes which impart improved solute rejection properties to the membranes. It is also an object of this invention to provide treatments for such membranes which impart to them improvements in permselective separation efficiency. These and other objects are achieved by the invention described hereinafter.

The present invention provides a process for separating solvent from an aqueous mixture containing a solute other than aqueous tanning extracts, comprising contacting a non-porous semipermeable membrane, the flow of fluids through which is substantially in accordance with Fick's laws, with said mixture under permselective separation conditions, said membrane having been treated with a solution of a hydrolyzable tannin in an amount and under conditions which result in an initial reduction in solute passage through the membrane of at least 10%.

DESCRIPTION OF THE INVENTION

1. Membranes

The semipermeable non-porous membranes useful in accordance with this invention can be in any of several forms, such as thin coatings on porous substrates, thin films supported by porous substrates, and thin-walled hollow fibers. The porous substrates can in turn be shaped as tubes supporting either internal or external membranes, as flat plates, and as corrugated sheets.

As used herein, the term "semipermeable" has the usual denotation of the ability to preferentially permeate one or more components of a fluid mixture while simultaneously restraining permeation of one or more other components. For the purposes of the present invention, a membrane is considered semipermeable when it exhibits a solute passage of less than 20 percent under permselective separation conditions such that a useful amount of a solvent component of the fluid mixture passes through the membrane. For the processes of this invention which involve aqueous solution separations under reverse osmosis conditions, a useful solvent flux is considered to be a solvent passage through the membrane of at least 0.15 gallon per square foot per day with an applied pressure of 600 pounds per square inch gage on an aqueous solution containing 0.5 weight percent sodium chloride under conditions such that between 5% and 50% of the feed solution passes through the membrane. The preferred semipermeable membranes suitable for use in this invention exhibit a solute passage of less than 10 percent under these conditions.

Isotropic membranes are of substantially uniform physical structure throughout. Some isotropic membranes have densities characteristic of the polymers of which they are composed and are substantially free of pores and voids. Fluid passage rates through such membranes typically increase with applied pressure and exponentially at higher temperatures. Rates of fluid flow through such membranes are usually relatively slow but the rejections of ionic, colloidal, and high molecular weight components under reverse osmosis conditions are usually substantially complete.

Other isotropic membranes have densities substantially less than the polymers of which they are composed and contain significant volume fractions of uniformlly distributed pores and voids which can be detected by optical and electron microscopic techniques. Rates of fluid flow through such membranes are usually relatively high and the rejection of ionic components under reverse osmosis conditions is usually relatively low.

Anisotropic membranes have substantially non-uniform physical structures, and more particularly as used herein have relatively thin and dense surface portions or "skins" associated with relatively more porous, more thick, and less dense inner portions. The dense surface layers function substantially as ultra-thin isotropic permselective membranes and the interior portions function as porous mechanical support structures. Such membranes exhibit relatively high fluid flow and also relatively high rejections of ionic, colloidal, and high molecular weight components under permselective separation conditions.

The more common of the recently improved permselective membranes are anisotropic membranes, frequently referred to as asymmetric membranes, with a thin dense layer on only one surface. The fluid flow and rejection properties of such membranes are also asymmetric in that they depend on the direction of fluid flow through the membrane. Typically, fluid flow under pressure is less rapid and rejection of ionic species is more complete when the pressurized fluid is contacted with the less porous, more dense surface of the membranes than when the pressurized fluid is contacted with the more porous, less dense surface.

Such anisotropic, or asymmetric, membranes are usually prepared by processes involving (a) forming a casting dope of a polymer in an organic solvent, optionally containing an agent which modifies the surface and/or inner pore structure of the final membrane, (b) forming a film of the dope on a non-porous support or in the form of a hollow filament or fiber, (c) evaporating a portion of the solvent from the exposed surface of the film or filament, and (d) extracting the remaining solvent and any structure-modifying agent with a non-solvent for the polymer. Such processes produce a membrane with a thin, dense "skin" layer on the surface from which the solvent has evaporated and a more thick porous region through the remainder of the structure. Processes for producing asymmetric or anisotropic membranes of various porosities and chemical compositions are described throughout the art including U.S. Pat. Nos. 3,133,132; 3,283,092; 3,344,214; 3,522,355; 3,567,632; 3,592,672; 3,615,024; and 3,636,150.

The membranes used in the processes of this invention are non-porous. The flow of fluids through non-porous membranes is substantially in accordance with Fick's laws, whereby the rate of passage of any component of a fluid through a membrane is related to the solubility and diffusivity of the component in the membrane material and this rate increases with applied pressure due to the resulting increase in the chemical potential of the component across the membrane. In contrast, porous membranes exhibit flow properties related to the sizes of pores extending through the membrane thickness as indicated by the equations of Poiseuille and Knudsen and various modifications thereof as discussed in Perry's Chemical Engineers' Handbook, Fourth Edition, Chapter 17, pages 33ff (1963) and elsewhere. The relative porosity and non-porosity of membranes can be determined by measuring the relative flow rates of the components of mixtures through the membranes at different pressures. Such studies are complicated and the results are dependent on the particular flow model presumed in the mathematical analysis of the primary data.

For semipermeable membranes useful in reverse osmosis separation processes of this invention, the degree of porosity of a membrane can be determined by the salt passage through the membrane under specified reverse osmosis conditions. The term "non-porous" is applied herein to such membranes which have salt passages of preferably less than about 10 percent with an applied pressure of 600 pounds per square inch gage on an aqueous solution containing 0.5 weight percent sodium chloride under conditions such that between about 5% and about 50% of the feed solution passes through the membrane. In contrast, semiporous membranes, wherein solute passage is primarily through relatively small pores, have salt passages ranging generally between about 25 percent and 50 percent under these conditions. Typical membranes of this porosity are those described by McLain, et al., in U.S. Pat. No. 3,423,491 and by Cescon, et al., in U.S. Pat. No. 3,551,331. Similarly, porous membranes have salt passages ranging generally between about 80 percent and 100 percent under these conditions. Typical permselective membranes and structures of this porosity include those described by Kraus, et al., in *Desalination*, Volume 2, pages 243 to 260 (1967) and in U.S. Pat. Nos. 3,344,928 and 3,449,245. Membranes with combinations of porous, semiporous, and non-porous flow properties typically have intermediate salt passages under these reverse osmosis conditions.

2. Polymers

The polymers suitable for use in the semipermeable membranes of this invention are non-porous semipermeable polymers such as poly(arylene ether sulfones), cellulose acetates, and the substantially linear synthetic organic aromatic polymers.

"Substantially linear" polymers exhibit the general solubility and melting properties characteristic of linear polymers as contrasted to highly cross-linked polymers but can contain minor amounts of cross-linked and chain-branched structures.

"Synthetic organic" polymers are "man-made" in the usual connotation and are generally composed substantially of carbon, hydrogene, oxygen, nitrogen, and sulfur. These polymers can also contain minor amounts of other atoms.

"Aromatic polymers" are polymers in which at least about 50 percent of the hydrocarbon groups in the polymeric chain contain 5-membered or 6-membered ring systems subject to resonance bonding, which systems can contain herero atoms such as oxygen and nitrogen.

"Sulfonic acid moieties" as used herein include the sulfonic acid group ($-SO_3H$) and salts derived therefrom which can be converted to sulfonic acids by treatment with mineral acids. Their presence in polymers can be detected by the presence of sulfur, e.g. by chemical analysis, and by titration of the sulfonic acid form with suitable bases as is well-known in the ion-exchange resin art. These moieties are usually present in reverse osmosis membranes during use in the form of salts, with compositions depending on the permselective and ion exchange properties of the membranes and of the solutions in contact therewith.

One preferred class of polymer membranes useful in accordance with this invention consists essentially of one or more nitrogen-linked condensation polymers of the general formula

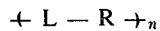

(1)

in which
i. each —L— group, as it occurs along the polymer chain, is independently a linking group, and is a

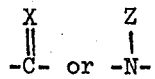

group wherein each X is independently oxygen or sulfur and each Z is independently hydrogen lower alkyl or phenyl,
ii. each —R— group, as it occurs along the polymer chain, is independently an organic radical,
iii. the degree of polymerization is indicated by $n$, an integer sufficiently large to provide film-forming molecular weight, and the terminal groups of the polymer chains are not defined.

These polymers and methods for preparing membranes therefrom are described in detail in Richter, et al., U.S. Pat. No. 3,567,632.

By the term "independently" is meant that each —L— or —R— group may be the same as or different from each other —L— or —R— group along the same copolymer backbone chain.

"Condensation polymers" contain a backbone chain composed of alternating —L— groups and —R— groups which is formed by a condensation polymerization reaction as contrasted to a free-radical polymerization reaction. Polymers are useful which have molecular weights of sufficient magnitude so that they are film-forming or fiber-forming and have a non-tacky surface at room temperature when dry. Polymers with an inherent viscosity above about 0.6 are useful and polymers whose inherent viscosity is between about 0.8 and about 3.0 are preferred.

"Nitrogen-linked" polymers contain nitrogen atoms in the polymer chain as linking parts of at least about 50 percent of the —L— groups. They can also contain other nitrogen atoms either as part of or attached to the —R— groups. Any remaining linking groups can be other functional groups formed by condensation reactions, such as sulfone, keto, ether and carboxylic ester groups.

A preferred subclass of the nitrogen-linked polymers are those containing sulfonic acid moieties in amounts ranging between about 0.1 and about 5 sulfonic acid moieties per 1,000 grams of dry polymer. This subclass includes among others the polyamides, polyoxamides, polyacyl hydrazides, polydiacyl hydrazides and polysemicarbazides of formula (1) above containing the requisite number of sulfonic acid moieties.

Another subclass of nitrogen-linked polymers useful in membranes as described herein, are those in which each

structure in the —L— groups can be a

group in which the third valence of the nitrogen atom is linked to an aromatic ring which is also separated from the

group in the polymer chain by an

structure linked to the aromatic ring vicinally to the

structure so that the complete unit forms a benzimidazole structure of the type

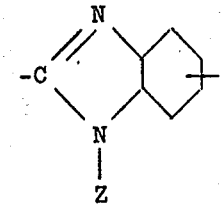

In the preferred polymers of this type, two such units are combined in a structure of the type

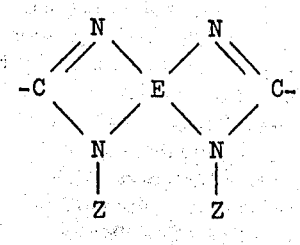

in which Z is a radical as defined above and E is a tetravalent aromatic radical which can be a monocarbocyclic, monoheterocyclic, fused carbocyclic, or fused heterocyclic radical or a radical of the formula

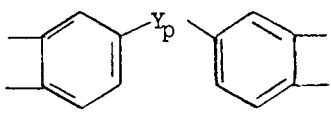

in which p is zero or one and Y is a divalent radical such as —CO—, —O—, —S—, —SO$_2$—, —NH—, and lower alkylene including alkylidene. In other polymers of this class, the —L— groups can be of the structure

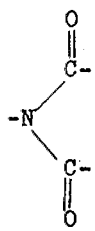

in which the fourth valences of the carbonyl carbon atoms are linked vicinally to an aromatic ring in the polymer chain structure so that the complete unit forms an imide structure of the type

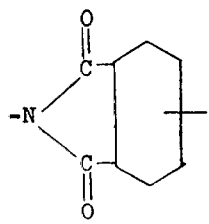

In preferred polymers of this type, two such units are combined in a structure of the type

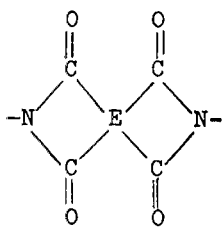

in which E is a tetravalent aromatic radical as defined above.

Polyimides suitable for use in membranes as described herein include those obtained by the action of heat and, optionally, of chemicals upon suitable polyamide-acids as taught, for example, by Koerner, et al., in U.S. Pat. No. 3,022,200 and in the other patents and applications mentioned by Dinan in U.S. Pat. No. 3,575,936. Useful polyamide-acids include those of the AB type formed by self-condensation of an amino aromatic dicarboxylic acid anhydride or acid salt thereof as well as those of the AA-BB type formed by reaction of an aromatic tricarboxylic acid anhydride or acid halide thereof, or of an aromatic tetracarboxylic acid dianhydride, with a mixture of an organic diamine and a phenylene diamine sulfonic acid salt.

Another suitable class of polymer membranes are those which consist essentially of poly(arylene ether sulfones). U.S. Pat. No. 3,567,810 discloses preparation of membranes of such polymers which are asymmetrical although not highly permselective. The methods disclosed in that patent can be used, however, to prepare membranes suitably permselective for use in this invention.

Preferred among this class of membranes are those described by Quentin in German Offenlegungsschrift No. 20 21 383 (laid open for public inspection 11-12-71). These membranes consist essentially of poly(arylene ether sulfones) containing sulfonic acid moieties and recurring units having the general formula

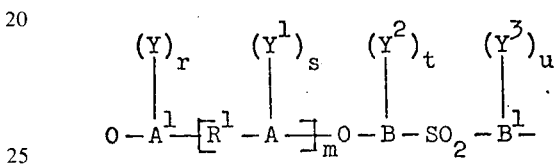

in which
A, A$^1$, B, and B$^1$, are the same or different aromatic residues, at least one of which is substituted with one or more sulfonic acid (—SO$_3$H) moieties, the residues are preferably phenylene residues and most preferably paraphenylene residues, Y and Y$^1$ are the same or different and are substituents which are inert under sulfonation conditions, representative substituents are alkyl and alkoxy containing one to four carbon atoms, and halogen;

Y$^2$ and Y$^3$ are the same or different and are substituents which are inert under sulfonation conditions and withdraw electrons from the aromatic residues to which they are attached, representative substituents are nitro, phenylsulfonyl, alkylsulfonyl, trifluoromethyl, nitroso, and pyridyl groups;

R$^1$ is a valence bond or a linking structure from the group —CO—; —O—; —SO$_2$—; and divalent organic hydrocarbon radicals such as cycloalkylene radicals of five to seven carbon atoms, arylene radicals such as phenylene or methylphenylene, and —CR$_2$$^2$— in which R$^2$ is hydrogen, lower alkyl, lower aryl or halogen and the two R$^2$'s can be the same or different such that the total number of carbon atoms is between one and seven;

r, s, t, and u are small whole numbers between zero and four inclusive so long as one of these numbers is less than four; and m is zero or one.

Poly(arylene ether sulfones) from which these polymers can be obtained by sulfonation and methods for their preparation are described by Johnson and Farnham in British Pat. No. 1,078,234 (8-9-67). They can be obtained by the reaction of a double alkali metal salt of a suitable dihydric phenol with a dihalodiphenylsulfone in an inert highly polar solvent, e.g., dimethylsulfoxide or tetramethylene sulfone. These poly(arylene ether sulfones) can be sulfonated, as described by Quentin in German Offenlegungsschrift No. 20 21 383, with chlorosulfonic acid, sulfur trioxide, addition products of sulfur trioxide and Lewis bases, sulfuric acid, and oleum at temperatures of −50° to +80°C., and preferably at −10° to +25°C., in a solvent for the poly(arylene ether sulfone) which is inert toward the sulfonating agent, e.g., methylene chloride, chloroform, 1,2-dichloroethane, and 1,1,2,2-tetrachloroethane.

Such sulfonated poly(arylene ether sulfones) are in general soluble in polar solvents, e.g., dimethylformamide and nitrobenzene, and permselective membranes can be prepared from them as described by Quentin in the above reference by casting a solution of the polymer on a surface of the desired shape and evaporating the solvent or by procedures analogous to those described by Richter and Hoehn in U.S. Pat. NO. 3,567,632 in which the solvent is extracted from a shaped structure of the polymer in a suitable solvent.

Particularly preferred among such membranes are those prepared from sulfonation products of a polymer of the above class in which A, $A^1$, B, and $B^1$ are p-phenylene radicals, $r$, $s$, $t$, and $u$ are zero, $m$ is one, and $R^1$ is the isopropylidene radical, which polymer contains recurring units having the formula

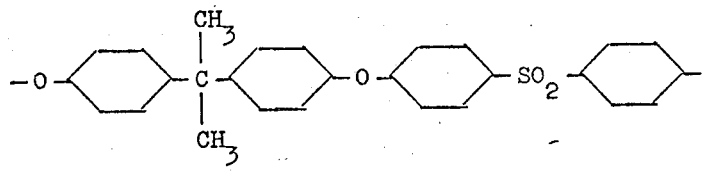

which sulfonation products contain between 1 and 2 equivalents of sulfonic acid groups per 1,000 grams of dry polymer.

Another class of polymer membranes useful in accordance with this invention includes the permselective membranes described by Kimura in Industrial and Engineering Chemistry, Product Research and Development, Vol. 10, No. 3, pages 335 to 339 (1971) and by Chludzinski et al. in the Office of Saline Water Research and Development Progress Report No. 697, June, 1971, which membranes are composed essentially of the sulfonated poly(phenylene ethers) described by Fox and Shenian in U.S. Pat. No. 3,259,592 and the non-sulfonated poly(phenylene ethers) described in Netherlands Pat. No. 71 14362. These poly(phenylene ethers) contain the repeating structural unit

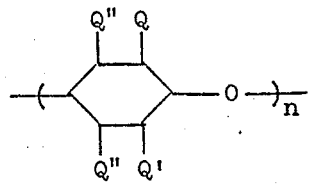

in which the oxygen atom of one unit is connected to the benzene nucleus of the adjoining unit, the subscript $n$ is a positive integer and is at least 100; Q is a monovalent substituent selected from the group consisting of hydrogen, aliphatic hydrocarbon radicals free of a tertiary alpha-carbon atom, and aliphatic halohydrocarbon radicals having at least two carbon atoms and being free of a tertiary alphacarbon atom; Q' is a monovalent substituent which may be the same as Q or a halogen, an aryl hydrocarbon radical, haloaryl hydrocarbon radical, hydrocarbonoxy radical having at least two carbon atoms and being free of an aliphatic tertiary alpha-carbon atom, or a halohydrocarbonoxy radical having at least two carbon atoms and being free of an aliphatic alpha-carbon atom and Q'' is the same as Q' or the sulfonic acid group —$SO_3H$, there being at least one —$SO_3H$ group in a substantial portion of the units of the preferred membranes. The most preferred membranes of this class are made of the polymer obtained by the sulfonation of poly(2,6-dimethyl-1,4-phenylene ether). Other membranes can be made of polymers obtained by sulfonating poly(2-methyl-6-ethyl-1,4-phenylene ether) and poly(2-methyl-1,4-phenylene ether) as well as other poly(phenylene ethers). Such sulfonated poly(phenylene ethers) can be obtained by the action of fuming sulfuric acid or chlorosulfonic acid on the poly(phenylene ether) dissolved in chloroform and permselective membranes of the sulfonated polyethers can be prepared by casting a solution of the hydrogen form of the polymer in chloroform containing methanol or isopropanol, drying the cast film in air, and wetting the resulting dried film with sodium chloride solution to separate it from the casting plate and complete the formation of the membrane in the sodium salt form of the polymer. Such membranes can be made from polymers containing from about 0.1 to about 5 and preferably about 1 to about 4.5 sulfonic acid moieties per 1,000 grams but are more effective in reverse osmosis applications when made of polymers containing between about 2 and about 3 sulfonic acid moieties per 1,000 grams of polymer.

Another class of membranes suitable for use in this invention are those composed primarily of cellulosic ether and ester derivatives as disclosed in Loeb, et al., U.S. Pat. No. 3,283,042. These derivatives have the general formula

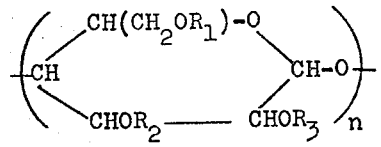

wherein $R_1$, $R_2$ and $R_3$ are hydrogen, alkyl of one to eight carbon atoms or $CR_4O$ wherein $R_4$ is alkyl of one to seven carbon atoms, and the degree of polymerization is indicated by n, an integer sufficiently large to provide film forming molecular weight.

3. The Tannins

The hydrolyzable tannins employed in the membranes of this invention are conveniently obtained by extracting leaves, twigs, bark, fruit and galls of trees and plants. By the term "hydrolyzable" is meant that they can be hydrolyzed with hydrolytic agents such as acids, alkali, hot water or enzymes to obtain gallic acid (such tannins are gallotannins) or ellagic acid (such tannins are ellagitannins). Tannins are common, well known compositions and are discussed extensively in "Chemistry of Vegetable Tannins" by Haslam, Academic Press, London, 1966, pp. 91-125. Particular hydrolyzable tannins are usually identified from the source (tree or plant) of extraction, as, for example, chinese gall (tannic acid), mimosa tannins, quebracho tannins, wattle tannins, chestnut tannins, eucalyptus tannins, tea extract tannins, and the like.

In general, tannins can be structurally characterized as a hydrolyzable mixture of complex polyphenolic substances having molecular weights in the range of 900-3,000. In general, they are obtained by leeching leaves, galls, fruits, bark, and the like, with acetone and/or water, followed by extraction of the resulting solution with ethyl acetate, and evaporation of the ethyl acetate.

The preferred tannin for use in this invention is tannic acid. This tannin is obtained from the extraction of nut galls and is an amorphous powder occurring as glistening scales or spongy masses varying in color from yellow-white to light brown. Its properties are described in the Condensed Chemical Dictionary, Reinhold Publishing Corp., 7th Edition.

4. Membrane Treatment

The separation processes of this invention employ membranes treated by contacting with solutions of hydrolyzable tannins under conditions which result in a significant reduction in solute passage through the membrane. With respect to this invention, a significant reduction in solute passage is a reduction of 10 percent in the percent passage of a solute through the membrane under permselective separation conditions. Such conditions can be reverse osmosis conditions, for instance with an applied pressure of 600 pounds per square inch gage on an aqueous solution containing 0.5 weight percent sodium chloride and with between about 5% and 50% of the feed solution passing through the membrane. Thus, if the untreated membrane has a solute passage of 20 percent under permselective conditions, a reduction in solute passage of 2 percent or more is considered significant. Similarly, if an untreated reverse osmosis membrane has a salt passage of 2 percent, a reduction in salt passage of 0.2 percent or more to obtain a salt passage of 1.8 percent or less is considered significant. The preferred treated membranes of this invention demonstrate a reduction in solute passage of at least 50 percent.

It has been found that membranes of different types differ substantially in the change in solute passage resulting from treatment with solutions of hydrolyzable tannins under various conditions. The observed differences in the reduction in solute passage upon treatment are apparently related to the compositions of the membranes, the techniques by which they are made, their physical structure, and the conditions of contacting with the solution of hydrolyzable tannin. The membrane treatment conditions required for a significant reduction in solute passage will depend, therefore, upon such factors as the physical structure and chemical compositions of the membrane, the concentration of hydrolyzable tannin in the treating solution, the relative amounts of treating solution and membrane, the time and temperature of treatment, and in particular on the acidity (pH) of the treating solution and the pressure of the treating solution on the membrane. In general, the reduction in solute passage will be greater as the treating solution contains more hydrolyzable tannin, as the treating time is longer, as the treating temperature is higher, and in particular as the treating solution is more acidic (with lower pH) and is applied to the membrane at higher pressure. Thus, one skilled in the art can determine, easily and without undue experimentation, contacting conditions which result in a significant reduction in solute passage with any particular membrane by simple measurement before and after a series of treatments made in accordance with the general principles discussed hereinbelow.

One result of the treatment of a semipermeable membrane with a solution of a hydrolyzable tannin is an association with the membrane of at least a portion of the tannin in the treating solution. The amount of a hydrolyzable tannin which must be associated with a membrane for a significant decrease in solute passage cannot be predicted. Available evidence indicates that the hydrolyzable tannins change the surface properties of the contacted membranes so as to change the relative rates of passage of solutes and solvents without significantly affecting the bulk properties of the membranes, so the amount of a tannin which must be associated with a membrane for a significant effect on solute passage properties depends upon a large number of variables, which interact to influence the permselective properties of the membrane in ways which are not completely understood. Very small amounts of tannins are usually required however. For example 0.25 to 250 milligrams per square centimeter of hydrolyzable tannins are absorbed rapidly from solutions containing only a few parts per million of tannins and can have long-lasting effects on the solute passage properties of a membrane.

A non-porous permselective membrane can be contacted with a solution of a hydrolyzable tannin in at least two general ways: (1) by dipping and/or soaking the membrane in the treating solution before assembly of the membrane into a permselective separation device, or (2) by passing the treating solution over the surface of the membrane after the membrane has been assembled in a separation device. Obviously, a membrane which has been treated before the assembly of a separation device can also be treated in the device either before or after the membrane is used for a permselective separation.

Hydrolyzable tannins are preferably dissolved in water for treating semipermeable membranes as described herein, but can be in solution in aqueous mixtures containing methanol, ethanol, propanol, and/or butanol. The solutions of such tannins are preferably weakly acidic, since most hydrolyzable tannins are weakly acidic materials and are subject to oxidation and hydrolysis in alkaline solutions. For instance, solutions having the acidity autogenously produced by the tannin in the absence of other acidifying materials will be between about 4 and about 6 in pH. With some membrane compositions and physical types, however, it is preferred that the treating solution have a degree of acidity greater than that autogenously produced by the tannin in order to obtain a greater and more significant reduction in the salt passage of the membrane. With such membranes, the treating solution preferably has a pH between about 1.5 and about 4.

Experience has shown that very small amounts of hydrolyzable tannins are required in treating solutions in practicing this invention. Solutions containing as little as 0.0002 weight percent (2 parts per million) of tannin can be used, and concentrations up to 2 weight percent and higher can also be used. A solution containing 0.01 weight percent (100 parts per million) to 1 weight percent is preferred in a dipping process and a solution containing 0.0005 (5 parts per million) to 0.05 weight percent is preferred in a process involving exposure of the membrane to the contacting solution under reverse osmosis conditions. Generally speaking, a concentration of at least about 5 p.p.m. is preferred and 50 p.p.m. is more preferred. The concentration of tannin required in the contacting solution will, of course, depend upon such factors as the physical structure and chemical composition of the membrane, the relative amounts of membrane and contacting solution used, and the degree of change in salt passage desired from the treatment. One skilled in the art can determine easily and without undue experimentation a contacting solution concentration which is appropriate.

The amounts of hydrolyzable tannin solutions used in the membrane treating processes described herein can be very small. In general, the amount of solution required to fill any vessel containing a membrane will provide sufficient tannins for a significant reduction in solute passage, particularly when the concentration of tannins in the solution is relatively large. An amount of solution and concentration of solution which provide as much as 25 micrograms of tannins per square centimeter of treated membrane surface will usually be sufficient.

While very dilute solutions of hydrolyzable tannins have been found to be effective in reducing solute passage through semipermeable membranes in the processes described herein, it has been found that an effective portion of such tannins must be in chemically uncombined form when contacted with the membranes. Thus, in practice, the solutions brought into contact with water-wet membranes must be either substantially free of tannin-reactive materials, must contain tannins in excess of the amount required to react with any small amount of tannin-reactive materials which may be present, or must contain agents which prevent chemical reaction between tannins and otherwise tannin-reactive materials.

Tannin-reactive materials which are frequently associated with permselective membrane systems include dissolved salts and colloidal hydrous compounds of heavy metals such as copper, tin, lead, iron, chromium, and nickel. Such materials are frequently present in small quantities in waters which have been exposed to brass, bronze, iron, steel, and non-rusting alloy pipes and fittings and are therefore present in waters to which permselective membranes are exposed. Hydrolyzable tannins are quite reactive chemically with such dissolved and colloidal hydrous metal compounds.

In treating permselective membranes in systems containing small amounts of tannin-reactive materials it is usually desirable to include in the contacting solution, along with a hydrolyzable tannin, one or more agents which prevent reaction between the tannin and such materials. These agents include mineral and organic acids which form relatively stable and soluble compounds or complexes with heavy metals. The preferred such agents are chelating materials commonly used to complex or sequester soluble heavy metals in aqueous solutions, e.g., ethylenediaminetetraacetic acid and related materials, and also the organic acids and their ammonium, alkali, and alkaline earth metal salts which are commonly used to dissolve colloidal hydrous heavy metal compounds in aqueous systems, e.g., oxalic, citric, maleic, fumaric, and ascorbic acids. Such agents are useful at concentrations between about 0.1 and 2 weight percent in contacting solutions containing between about 0.001 and 0.05 weight percent of hydrolyzable tannins. The preferred such agent is citric acid and its soluble salts.

Semipermeable membranes can be treated with tannin solutions at any temperature between the freezing and boiling temperatures of water but are conveniently treated at temperatures between about 10°C. and about 90°C. Processes involving exposure of membranes to treating solutions under osmotic or applied pressures in assembled devices are more conveniently operated near or slightly above ambient temperatures, for example between about 20°C. and about 40°C. The reduction in solute passage is frequently larger in membranes which have been soaked in treating solutions at elevated temperatures, for exampple between about 40°C. and about 90°C. Significant reductions in solute passage can be obtained upon contacting semipermeable membranes with tannin solutions for times as small as one second or less (as in passing a membrane film or filament continuously through a relatively concentrated treating solution) and times as long as several days (as in adding a suitable tannin to the feed of a reverse osmosis device operating under pressure with a relatively low throughput). Treating times will usually be between about 30 seconds and about 24 hours and preferably will be between about 2 minutes and about 5 hours. The benefits of these treating processes are obtained quickly and little or no additional benefit is derived from treating times beyond a few hours.

Membranes made of some polymers, for example linear aromatic synthetic polymers containing sulfonic acid moieties, can be effectively treated with solutions of hydrolyzable tannins without pressure. More significant reductions in solute passage are obtained with membranes of other polymers, for example cellulose acetate and some aromatic polyamides and poly(amide-hydrazides) devoid of sulfonic acid moieties, upon treatment under osmotic or applied pressure. Such membranes are preferably exposed to treating solutions at a pressure of at least 100 pounds per square inch and more preferably at a pressure of at least 250 pounds per square inch. In general, the reduction in salt passage is larger with these membranes when the treatment is carried out either with a solution having a greater acidity (lower pH) or at higher pressure, and such membranes are most preferably exposed to treating solutions having pH between about 2 and 4 and at a pressure of at least 100 pounds per square inch. Asymmetric membranes are preferably contacted with treating solutions on their more permselective side under such conditions.

5. Use

The semipermeable membranes containing hydrolyzable tannins described herein can be used for aqueous selective permeation separation processes such as reverse osmosis and ultrafiltration. In an aqueous reverse osmosis process water is forced from an aqueous solution through a membrane by a pressure greater than the osmotic pressure of the solution to obtain products containing reduced and increased proportions, respectively, of at least one component of the solution. The subject membranes are particularly useful for the reverse osmosis desalination of saline and brackish waters. In an aqueous ultrafiltration process water is forced by pressure from an aqueous mixture through a membrane to obtain products containing reduced and increased proportions of a dissolved or dispersed component which has a molecular or particle size such that the mixture has a relatively low osmotic pressure. Typical ultrafiltration processes include the isolation of virus and bacteria, fractionation of blood fluids and the concentration of alkaloids, glucosides, serums, hormones, vitamins, vaccines, aminoacids, antibiotics, fruit and vegetable juices, sugar solutions, milk liquids, extracts of coffee and other vegetable materials, and many other such systems.

The invention described herein is illustrated by the following examples, in which all parts and percentages are by weight unless otherwise indicated.

EXAMPLE 1

Substantially as described by Magat in Example 10 of U.S. Pat. No. 3,184,436, a mixture of 70 parts of isophthaloyl chloride and 30 parts of terephthaloyl chloride was added gradually to a dimethylacetamide solution of a substantially stoichiometric amount of a mixture of 80 parts of metaphenylene diamine and 20 parts of the calcium salt of metaphenylene diamine-4-sulfonic acid. The resulting polymer nominally contained 1.5 percent sulfur, equivalent to 0.46 sulfonic acid moieties per 1,000 grams. Acetamide containing 20 parts of lithium nitrate and 6 parts of lithium chloride (based on the polymer present) was spun through a 150 hole spinneret to obtain hollow fibers substantially as described in Example 2 of Richter, et al., U.S. Pat. No. 3,567,632. These hollow fibers were extracted with water to obtain asymmetric hollow fiber membranes with an outside diameter of 87 microns and an inside diameter of 40 microns. These membranes were kept wet with water until used.

Four lengths of the 150 filament skeins of hollow fiber membranes, each about 1 meter long, were placed into separate 100 milliliter bottles. Two of the bottles were filled with deionized water and the other two were filled with a solution made by dissolving 0.5 % tannic acid (Mallinckrodt Chemical Co., Analytical Reagent grade) in deionized water and adjusting to pH 4 with sodium hydroxide. The bottles were held in a water bath controlled at 55°C. for 16 hours. The hollow fiber membranes were removed from the bottles, rinsed with deionized water, and stored in deionized water until assembled into reverse osmosis separation units. In assembling such units each 150 filament skein of hollow fibers was doubled to obtain 300 parallel fibers and, while wet with water, was inserted into a plastic tube fitted with a side tube near each end. The hollow fiber membranes were sealed into the plastic tube with epoxy resin at each end and then were carefully cut outside the end seals to open the hollow fibers for fluid flow. An end fitting and a pressure gauge were attached at one end for measurement of "dead end" pressure and the other end was attached to a buret for measurement of water flow from the open ends of the hollow fibers under reverse osmosis conditions. The resulting units contained hollow fiber membranes with an effective length of 24 inches and a nominal effective area of 0.25 square feet of membrane surface.

The permselective properties of these hollow fiber membranes were determined under reverse osmosis conditions at an applied pressure of 600 pounds per square inch gauge (p.s.i.g.) with an aqueous solution containing 0.5 % sodium chloride in a system containing "Monel" metal parts. After about 24 hours under these conditions one of the units containing membranes held at 55°C. for 16 hours in deionized water had a flux rate of 1.36 gallons per square foot per day (g.s.f.d.) and a salt passage of 2.84% under conditions such that about 2.8% of the feed solution passed through the unit was passed through the membrane (2.8% conversion) and the "dead end" pressure was 90 p.s.i.g. After about 72 hours one of the units containing membranes held at 55°C. for 16 hours in deionized water had a water flux rate of 1.92 g.s.f.d. and a salt passage of 2.88% under conditions such that about 7.8% of the feed solution passed through the membrane and the "dead end" pressure was 112 p.s.i.g. After about 48 hours the units containing membranes held at 55°C. for 16 hours in solutions containing 0.5% tannic acid had water fluxes of 2.07 and 1.67 g.s.f.d. and salt passages of 0.33% and 0.53% under conditions such that about 6% of the feed solutions passed through the membranes and the "dead end" pressures were 251 and 237 p.s.i.g. After 27 days exposure to the sodium chloride solution under reverse osmosis conditions the tannin-treated membranes had water fluxes of 1.79 and 1.74 g.s.f.d. and salt passages of 0.29% and 0.26% under conditions such that 4.4% and 4.7% of the feed solutions passed through the membranes and the "dead end" pressures were 250 and 246 p.s.i.g. During this period there was no significant decline in the water flux rate of the membranes contacted with solutions containing tannic acid.

EXAMPLE 2

A reverse osmosis separation unit was assembled as described in Example 1 with the hollow fiber membranes described therein. After exposure of these membranes to an aqueous solution containing 0.5% sodium chloride at a pressure of 400 p.s.i.g. for 22 hours, during which the membranes were exposed to metal compounds derived from Monel metal parts of the apparatus, these membranes had a water flux of 2.5 g.s.f.d. and a salt passage of 2.7% under conditions such that about 5.3% of the feed solution passed through the membranes and the dead end pressure in the unit was 153 p.s.i.g.

After 22 hours under reverse osmosis conditions, citric acid was added to the feed solution to obtain a solution containing 1.03% citric acid and 0.5% sodium chloride. After circulating this solution through the unit for one-half hour, tannic acid was added to the solution to obtain a solution containing 0.002% (20 parts per million) of tannic acid as well as citric acid and sodium chloride. After circulating this solution through the unit for 2 hours the feed solution was changed to an aqueous solution containing only 0.5% sodium chloride. After the membranes were exposed to this solution for 20 hours at 400 p.s.i.g., the water flux was 2.2 g.s.f.d. and the salt passage was 0.79% under conditions such that about 3.9% of the feed solution passed through the membranes and the dead end pressure was 147 p.s.i.g. After 17 days, during which the feed solution contained 1% citric acid as well as 0.5% sodium chloride for a period of 3½ hours, the membranes had with the solution containing only 0.5% sodium chloride a water flux of 2.1 g.s.f.d. and a salt passage of 0.8% under conditions such that about 3.7 % of the feed solution passed through the membranes and the dead end pressure was 141 p.s.i.g.

EXAMPLE 3

Hollow fiber membranes with an outside diameter of 91 microns and an inside diameter of 41 microns were prepared as described in Example 1 and three reverse osmosis units (A, B, and C) were assembled as described therein. The hollow fiber membranes from units B and C were removed from their pressure tubes and placed into bottles containing 10 milliliters of aqueous 0.1% tannic acid. After about 5 minutes for equilibration, a two milliliter portion of the tannic acid solution was removed from each bottle for analysis. The membranes from unit B were removed from the tannic acid solution after 4 hours, rinsed thoroughly with water, and reinstalled in their pressure shell. Membranes from unit C were removed from the tannic acid solution after 21 hours and similarly rinsed and installed in their shell. The amounts of tannic acid absorbed by these membranes were determined by analysis of the residual solutions. The properties of the membranes in units A, B and C were determined under the conditions of Example 2. After about 24 hours the membranes had the separation properties described in Table I.

TABLE I

| Reverse Osmosis Unit | A | B | C |
| --- | --- | --- | --- |
| Soaking time (hours) | None | 4 | 21 |
| Tannic acid absorbed (micrograms per square centimeter) | — | 2.3 | 9.3 |
| Water flux (g.s.f.d.) | 2.7 | 2.9 | 2.6 |
| Salt passage (%) | 6.5 | 1.6 | 1.3 |
| Conversion (%) | 6.2 | 8.6 | 9.7 |
| "Dead end" pressure (p.s.i.g.) | 139 | 160 | 158 |

EXAMPLE 4

To a solution of approximately 80 grams of pelletized sulfonated poly(phenylene ether sulfone) ("Bakelite" polysulfone P-1700, Union Carbide) dissolved in 800 milliliters of chloroform was added 40 grams of chlorosulfonic acid over about 5 minutes as the mixture warmed slightly. A gummy second phase separated during about 30 minutes as sulfonation proceeded. Hexane was added, the supernatant liquid was decanted, and the second phase was dissolved in about 200 milliliters of dimethylacetamide. The resulting solution was neutralized with approximately 20 grams of lithium hydroxide monohydrate with stirring. The solution was warmed with an inert gas sweep to remove low boiling solvents and then was added to acetone in a high speed blender to obtain the sulfonated polyphenylene ether sulfone in granular form. The separated polymer was washed with acetone, rinsed with water until the rinsings were no longer alkaline and then dried.

Asymmetric semipermeable membranes were prepared from this polymer by procedures analogous to those of Richter, et al., U.S. Pat. No. 3,567,632. Films with a nominal thickness of 0.015 inch were cast with a doctor knife onto smooth plates using a solution containing 20% polymer and 30% lithium nitrate (based on the polymer present) in dimethylacetamide. These films and the supporting plates were heated on a hot plate at 100°C. in a ventilated hood for 2 minutes and were then immersed in water for about 1 hour to obtain permselective membranes, which were kept wet with water until use. One of these membranes was shown to contain 0.64 sulfonic acid groups per 1,000 grams of polymer by the procedure of converting the polymer to the acid form by soaking for 30 minutes each in three different portions of 1/10 molar hydrochloric acid; washing free of excess acid with deionized water; and titrating to pH 7 with 0.1 normal sodium hydroxide in 50 milliliters of water containing 25 milligrams of sodium chloride. One of the titrated membranes contained 8.7% sulfur, equivalent to 0.46 sulfonic acid groups per 1000 grams of dry polymer. Another of these membranes contained 0.55% lithium, equivalent to 0.80 sulfonic acid groups per 1000 grams of polymer.

Another of these membranes was installed in a reverse osmosis test cell. After 4 days exposure to a sodium chloride solution under the reverse osmosis conditions of Example 1, this membrane had a water flux of 10.4 g.s.f.d. and a salt passage of 7.1% under conditions such that about 5% of the feed solution passed through the membrane. The test cell was then filled with an aqueous solution containing 0.005% (50 parts per million) of tannic acid and 2% citric acid adjusted to pH 4 with ammonium hydroxide. The solution was maintained in contact with the film membrane for 2 hours at a pressure of 75 p.s.i.g. and the cell was then rinsed substantially free of tannic and citric acids. After an additional 20 hours exposure to the solution containing 0.5% sodium chloride at 600 p.s.i.g., the membrane had a water flux of 9.1 g.s.f.d and a salt passage of 3.0% under conditions such that less than 5% of the feed to the test cell passed through the membrane.

EXAMPLE 5

A polymer was prepared as described in Example 1 using a mixture of 67 parts of metaphenylenediamine and 33 parts of the calcium salt of metaphenylenediamine-4-sulfonic acid. This polymer nominally contained 2.5% sulfur, corresponding to 0.77 sulfonic acid moieties per 1,000 grams. Hollow fiber membranes having an outside diameter of 90 microns and an inside diameter of 46 microns were prepared from this polymer as described in Example 1.

A reverse osmosis separation unit was assembled with a first skein of these hollow fiber membranes as described in Example 1. After 4 hours exposure to a sodium chloride solution under the reverse osmosis conditions of Example 2, these membranes had a water flux of 3.22 g.s.f.d. and a salt passage of 6.8% under conditions such that about 10.5% of the feed solution passed through the membranes and the dead end pressure was 150 p.s.i.g. After 7 days under these reverse osmosis conditions these membranes had a water flux of 2.8 g.s.f.d. and a salt passage of 2.0% under conditions such that 7.1% of the feed solution passed through the membranes and the dead end pressure was 150 p.s.i.g.

A similar reverse osmosis separation unit was assembled with a second skein of these membranes after holding them at 55°C. for 200 minutes in an aqueous solution containing 0.1 % of tannic acid adjusted to a pH of 4 with sodium hydroxide. After 24 hours under reverse osmosis conditions of Example 2 these membranes had a water flux of 2.50 g.s.f.d. and a salt passage of 0.52% under conditions such that about 10.7% of the feed solution passed through the membranes and the dead end pressure was 121 p.s.i.g. After 3 days under such reverse osmosis conditions the feed was changed for 3 hours to an aqueous solution containing 0.83% sodium nitrate. The permselective properties of the membranes just before, during, and just after this change in the feed are shown in Table II, Part A. After a total of 7 days under the reverse osmosis conditions, these membranes had a water flux of 2.21 g.s.f.d. and a salt passage of 0.35% under condition such that about 9.5% of the solution passed through the membranes and the dead end pressure was 112 p.s.i.g.

A similar reverse osmosis separation unit was assembled with a third skein of these membranes after holding them at 55°C. for 200 minutes in an aqueous solution containing 0.06% acetic acid adjusted to a pH of 4 with sodium hydroxide. After 24 hours under the reverse osmosis conditions of Example 2 these membranes had a water flux of 2.45 g.s.f.d. and a salt passage of 4.4% under conditions such that about 10.9% of the feed solution passed through the membrane and the dead end pressure was 121 p.s.i.g. After 3 days under such reverse osmosis conditions the feed was changed for 3 hours to an aqueous solution containing 0.83% sodium nitrate. The permselective properties of the membranes just before, during, and after this change are shown in Table II, Part B. After a total of 8 days under reverse osmosis conditions these membranes had a water flux of 2.08 g.s.f.d. and a salt passage of 2.3% under conditions such that about 9.6% of the feed solution passed through the membrane and the dead end pressure was 121 p.s.i.g.

TABLE II

| Feed Solution | Water Flux (g.s.f.d.) | Salt Passage (percent) |
| --- | --- | --- |
| Part A - Membranes Contacted with Tannic Acid at pH 4 | | |
| 0.50% sodium chloride | 2.31 | 0.40 |
| 0.81% sodium nitrate | 2.34 | 2.56 |
| 0.53% sodium chloride | 2.34 | 0.43 |
| Part B - Membranes Contacted with Acetic Acid at pH 4 | | |
| 0.50% sodium chloride | 2.27 | 2.8 |
| 0.81% sodium nitrate | 2.26 | 6.1 |
| 0.50% sodium chloride | 2.28 | 2.8 |

EXAMPLE 6

Different skeins of the hollow fiber membranes of Example 3 were held for 16 hours at 55°C. in water and in an aqueous solution containing 0.1% tannic acid adjusted to pH 4 with sodium hydroxide and were then assembled into reverse osmosis separation units as described in Example 1. These membranes were maintained for over 15 days under the reverse osmosis conditions of Example 1, except for brief periods when the feed solution wash changed to (A) an aqueous solution containing 20 parts per million of poly(vinylmethylether) (PVME) with an average molecular weight of about 50,000 ("Gantrez" M-154), (B) an aqueous solution containing 0.5% sodium chloride and 1.0% citric acid, and (C) aqueous sodium hydroxide with pH 10.8. A feed of aqueous sodium hydroxide with pH 11.4 was also used with the membrane contacted with tannic acid. Typical water flux rates and salt passages are given in Table III. Duplicate skeins of the same membranes similarly contacted had substantially the same salt passages and rates of flux decline under the same conditions.

TABLE III

| Feed Solution | Feed Period | Day | Membrane Held 16 Hrs. at 55°C. in Water | | Membrane Held 16 Hrs. at 55°C. in 0.1% Tannic Acid | |
| --- | --- | --- | --- | --- | --- | --- |
| | | | Water Flux (g.s.f.d.) | Salt Passage (Percent) | Water Flux, (g.s.f.d.) | Salt Passage, (Percent) |
| 0.5% NaCl | Cont. | 2 | 2.89 | 3.65 | 2.99 | 0.25 |
| 0.5% NaCl | Cont. | 3 | 2.82 | 2.53 | 3.01 | 0.20 |
| 20 ppm PVME | 3 hrs. | 3 | — | — | — | — |
| 0.5% NaCl | Cont. | 3 | 2.64 | 1.04 | 2.89 | 0.17 |
| 0.5% NaCl | Cont. | 7 | 2.64 | 1.04 | 3.02 | 0.18 |
| 0.5% NaCl ⎱ 1.0% Citric ⎰ | 3 hrs. | 7 | — | — | — | — |
| 0.5% NaCl | Cont. | 8 | 2.24 | 0.37 | 2.87 | 0.165 |
| 0.5% NaCl | Cont. | 9 | 2.15 | 0.25 | 2.74 | 0.205 |
| pH 10.8 NaOH | 2.5 hrs. | 10 | — | — | — | — |
| 0.5% NaCl | Cont. | 11 | 1.34 | 0.37 | 2.89 | 0.150 |
| pH 11.4 NaOH | 2.5 hrs. | 12 | — | — | — | — |
| 0.5% NaCl | Cont. | 15 | — | — | 2.85 | 0.26 |

EXAMPLE 7

Two copolymers containing amide and hydrazide linkages and sulfonic acid moieties were prepared by adding, over about 2 hours and with cooling, a mixture of 70 parts of isophthaloyl chloride and 30 parts of terephthaloyl chloride to a dimethylacetamide solution containing a substantially stoichiometric amount of a mixture of 80 parts of 3-aminobenzhydrazide and 20 parts of 4-aminobenzhydrazide with amounts of the calcium salt of metaphenylenediamine-4-sulfonic acid calculated to produce polymers containing 0.85% and 2.5% sulfur. The mixtures were maintained at pH above about 3 during the polymerization reactions by the simultaneous addition of trimethylamine. The resulting polymers were end-capped with small amounts of aniline. The polymers were precipitated with water, washed substantially free of chloride salts, and dried. The polymer containing nominally 0.84% sulfur had an inherent viscosity of 0.79 (determined at a concentration of 0.05% in dimethylacetamide). Asymmetric permselective membranes of these polymers were prepared by procedures similar to those described in Richter and Hoehn U.S. Pat. No. 3,567,632 by casting 0.015 inch thick films of dimethylacetamide solutions containing about 15% polymer and 30% lithium nitrate (based on the weight of the polymer), heating these plates and films for 2 and 10 minutes on a hot plate maintained at 100°C. in order to evaporate a portion of the solvent, and quenching the resulting protomembranes in water. The membranes obtained were 0.0061 and 0.009 inch thick and were kept wet with water until used.

The permeselective properties of these membranes were determined under the reverse osmosis conditions of Example 1. After about 2 days the membrane of the polymer containing 0.84% sulfur had a water flux of 14.9 g.s.f.d. and a salt passage of 1.0% under conditions such that 5% to 10% of the feed solution passed through the membrane. Under similar conditions the membrane made of the polymer containing nominally 2.5% sulfur had a water flux of 29.1 g.s.f.d. and a salt passage of 4.3%. After these periods, the saline solution in the test apparatus was replaced with a solution containing 0.005% (50 parts per million) of tannic acid and 2% citric acid adjusted to pH 4 with ammonium hydroxide and the apparatus was operated for about 2 hours at a pressure of 75 p.s.i.g. with about 10% of the feed solution passing through the membrane. Subsequently, under the reverse osmosis conditions of Example 1, the membrane made of the polymer containing 0.84 % sulfur had a water flux of 12.6 g.s.f.d. and a salt passage of 0.6%, which properties did not change substantially over a period of 9 days. Similarly the membrane made of the polymer nominally containing 2.5% sulfur had a water flux of 28.7 g.s.f.d. and a salt passage of 3.4%, which properties did not change substantially over a period of 2 days.

EXAMPLE 8

To a solution of 20 grams of poly(2,6-dimethyl-1,4-phenylene ether), obtained from the General Electric Co. with the brand nane "Noryl", in 180 milliliters of chloroform was added, over 20 minutes at room temperature, a solution of 6.5 grams of chlorosulfonic acid in 100 milliliters of chloroform and the resulting reaction mixture was stirred for 1 hour at room temperature. The sulfonated polymer was precipitated by the addition of n-hexane and the separated sticky polymer mass was redissolved in about 200 milliliters of dimethylacetamide. To the resulting solution was added 2.5 grams of lithium hydroxide, sufficient to convert the sulfonated polymer to the lithium salt. This lithium salt was isolated by pouring the dimethylacetamide solution into rapidly stirred ice water. The flaky polymer so obtained was rinsed and dried. It contained 3.2% sulfur.

Asymmetric permselective membranes were prepared from the above polymer by casting 0.015 inch thick film of a solution containing 12% of the polymer in dimethylacetamide along with 30% nitrate (based on the weight of the polymer present) onto a glass plate, heating the glass plate for 2 minutes on a hot plate maintained at 100°C., and quenching the glass plate and partially dried film in water. The resulting membrane was 0.004 inch thick and was kept wet with water until used.

The permselective properties of this membrane were determined under the reverse osmosis conditions of Example 1. After about 2 days under conditions such that 5% to 10% of the feed solution passed through the membrane, the membrane had a water flux of 1.6 g.s.f.d. and a salt passage of 5.9%. The aqueous solution in the test cell was replaced for 2 hours, as described in Example 7, with a solution containing 0.005% (50 ppm) of tannic acid and 1% citric acid adjusted to pH 4 with ammonium hydroxide. After this treatment the membrane had a permeation rate of 1.4 g.s.f.d. and a salt passage of 4.1% under the reverse osmosis conditions of Example 1, which properties were substantially unchanged after 3 days.

EXAMPLE 9

Part A

A metaphenyleneisophthalamide/terephthalamide copolymer was prepared substantially as described by Richter et al., in U.S. Pat. No. 3,567,632 at col. 28, line 61. A mixture of 70 parts of isophthaloyl chloride and 30 parts of terephthaloyl chloride was added over about 2 hours to a stirred and cooled solution in dimethylacetamide of a substantially stoichiometric amount of metaphenylenediamine. The polymer was end-capped with a small amount of benzoyl chloride. The resulting polymer was isolated by pouring the polymerization solution into rapidly stirred water. The separated polymer was washed acid-free with water and then rinsed with methanol and dried. It had a relative viscosity of 1.28 (determined at a concentration of 0.5% in dimethylacetamide containing 4% lithium chloride). An asymmetric permselective membrane was prepared from this polymer by casting a 0.015 inch thick film of a solution containing 15% of the polymer in dimethylacetamide containing 15% lithium nitrate and 5% lithium chloride (each based on the weight of the polymer present) onto a glass plate, heating the glass plate for 5 minutes on a hot plate maintained at 100°C., and quenching the glass plate and partially dried film in water. The resulting membrane was kept wet with water until used.

The permselective properties of this membrane were determined under the reverse osmosis conditions of Example 2. The membrane had a water flux of 2.2 g.s.f.d. and a salt passage of 9.95% after about 12 hours exposure to the solution under conditions such that 5% to 10% of the feed solution passed through the membrane. To this aqueous solution for about 3 hours was added 1% citric acid and 0.002% (20 ppm) of tannic acid and the membrane was again exposed to a solution containing only 0.5% sodium chloride. After about 24 hours exposure to this latter solution at a pressure of 400 p.s.i.g., the water flux through the membrane was 1.5 g.s.f.d. and the salt passage was 0.68%, which properties were substantially unchanged over a period of 7 days.

Part B

The second asymmetric permselective membrane similar to the membrane of Part A was prepared by substantially the same procedure from a solution, containing no lithium chloride but 30% litnium nitrate (based on the weight of the polymer present), of a polymer of the same nominal composition but not end-capped. This polymer had an inherent viscosity of 1.41 (determined at a concentration of 0.5% in dimethylacetamide containing 4% lithium chloride).

The permselective properties of this membrane were determined under the reverse osmosis conditions of Example 1. After about 2 days under these conditions, the membrane has a water flux of 4.7 g.s.f.d. and a salt passage of 2.7%. A solution containing 0.005% (50 ppm) of tannic acid and 2% citric acid adjusted to pH 4 with ammonium hydroxide was passed through the test cell for 2 hours at a pressure of 75 p.s.i.g. under conditions such that about 10% of the feed solution passed through the membrane. After this treatment the membrane has a water flux of 4.3 g.s.f.d. and a salt passage of 4.4% under the reverse osmosis conditions of Example 1. After an additional 6 days under reverse osmosis conditions with this solution, the memmbrane had a water flux of 4.3 g.s.f.d. and a salt passage of 2.1%. The similar membrane not treated with the solution of a hydrolyzable tannin had after 6 days, under the same reverse osmosis conditions, a water flux of 4.6 g.s.f.d. and a salt passage of 1.8%.

EXAMPLE 10

Four membranes were prepared as follows: Membrane A was made of an aromatic polyamide containing nominally 2.5% sulfur corresponding to 0.77 sulfonic acid moieties per 1000 grams. This polymer was prepared by procedures substantially like the polymer preparation described in Example 4. An asymmetric membrane of this polymer in the form of its lithium salt was prepared by spreading on a glass plate a 0.015 inch thick film of a dimethylacetamide solution containing 15% of the lithium salt of the polymer, 5% lithium chloride and 15% lithium nitrate (both based on the polymer present), heating the glass plate for 5 minutes on a hot plate maintained at 100°C., and quenching the resulting partially dried film in water. The membrane was kept wet with water until use. Membrane B was made of a polymer containing amide and diacyl hydrazide groups prepared by adding a mixture of 70 parts of isophthaloyl chloride and 30 parts terephthaloyl chloride to a dimethylacetamide solution of a stoichiometrically equivalent amount of a mixture of 80 parts of 3-amino-benzhydrazide and 20 parts of 4-aminobenzhydrazide. The polymer was isolated by pouring the polymerization solution into ice water and washing free of acid and drying. Typical polymers thus prepared had inherent viscosities near 1.1 (as measured with a solution containing 0.5% of the polymer in dimethylacetamide at 25°C.). An asymmetric membrane of this polymer was prepared by pouring a 0.015 inch thick film on a glass plate of a dimethylacetamide solution containing 15% of the polymer and 30% lithium nitrate and 20% lithium toluene sulfonate (each based on the polymer present), heating the glass plate for 5 minutes on a hot plate maintained at 100°C., and quenching the resulting partially dried film in water. The resulting film, which contained 35.3% water, was kept wet with water until used. Membrane C was an annealed asymmetric cellulose acetate reverse osmosis membrane of Type KP-96, obtained from Eastman Chemical Products, Inc. The "as received" membrane was sealed in a plastic bag with sufficient water to cover all surfaces and the plastic bag was immersed for 1 hour in water maintained at 85°C. The membrane was kept wet with water until used. Membrane D was another portion of the asymmetric membrane of a sulfonated polyphenylene ether sulfone described in Example 4.

The permselective properties of these membranes were determined under the reverse osmosis conditions of Example 2. After 1 day each membrane was exposed for about 2 hours to a solution containing 0.5% sodium chloride and 1% citric acid and then again was exposed to the solution containing only 0.5% sodium chloride. After a second day each membrane was exposed for about 3 hours to a solution containing 0.5% sodium chloride, 1% citric acid, and 0.002% (20 ppm) tannic acid, and then again to the solution containing only 0.5% sodium chloride. The permselective properties of these membranes were determined over a total of 6 days. The observed water fluxes and salt passage percentages are given in Table I.

TABLE I

| Test Time | Membrane A Water Flux | Membrane A % Salt Passage | Membrane B Water Flux | Membrane B % Salt Passage | Membrane C Water Flux | Membrane C % Salt Passage | Membrane D Water Flux | Membrane D % Salt Passage |
|---|---|---|---|---|---|---|---|---|
| First day | 11.1 | 1.90 | 11.3 | 1.52 | 12.7 | 5.15 | 5.4 | 4.07 |
| Second day, with exposure to solution containing citric acid | | | | | | | | |
| Before exposure | 10.8 | 1.48 | 10.0 | 1.02 | 11.8 | 4.17 | 5.4 | 4.83 |
| After exposure | 11.2 | 1.00 | 11.7 | 0.84 | 12.8 | 3.94 | 4.7 | 2.52 |
| Third day, with treatment with solution containing citric and tannic acids | | | | | | | | |
| Before exposure | 10.4 | 1.10 | 11.6 | 0.72 | 12.8 | 3.83 | 4.2 | 4.23 |
| After exposure | 9.1 | 0.47 | 10.7 | 0.45 | 11.8 | 2.64 | 4.0 | 2.35 |
| Fourth day | 9.2 | 0.495 | 10.7 | 0.40 | 12.0 | 2.73 | 4.4 | 3.61 |
| Sixth day | 8.9 | 0.525 | 10.8 | 0.425 | 11.5 | 2.95 | 4.6 | 4.15 |

EXAMPLE 11

Another asymmetric membrane made of the same aromatic polyamide containing sulfonic acid moieties as Membrane A of Example 10 and prepared in substantially the same way as that membrane had a second day water flux of 10.0 g.s.f.d. and a salt passage of 1.43% under the reverse osmosis conditions of Example 2. This membrane was treated for about 3 hours with an aqueous solution containing 0.5% sodium chloride, 0.002% (20 ppm) of tannic acid and sufficient sulfuric acid to adjust the solution to pH 2.8. The next day this membrane had a water flux of 8.4 g.s.f.d. and a salt passage of 0.40%.

Another annealed asymetric cellulose acetate membrane like Membrane C of Example 10 had a second day water flux of 13.0 g.s.f.d. and a salt passage of 3.92% under the reverse osmosis conditions of Example 2. This membrane was also treated for about 3 hours with an aqueous solution containing 0.5 % sodium chloride, 0.002% (20 ppm) tannic acid and sufficient sulfuric acid to adjust to pH 2.8. The next day this membrane had a water flux of 10.8 g.s.f.d. and a salt passage of 2.12%.

EXAMPLE 12

Three membranes were prepared as follows: Membrane H was made of the same aromatic polyamide containing sulfonic acid moieties as Membrane A of Example 10 and was prepared in substantially the same way as that membrane. Membrane I was made of the same aromatic polyamide hydrazide as Membrane B of Example 10. This membrane was prepared by casting on a glass plate a 0.015 inch thick film of a dimethylacetamide solution containing 15% polymer, 4% lithium nitrate, 6% 2,11-diacetyl-2,11-diaza-5,8-dioxadodecane and 0.08% triethanolamine, heating the glass plate for 10 minutes on a hot plate maintained at 100°C., and quenching the resulting partially dried film in water. The membrane was kept wet with water until used. Membrane J was an annealed asymmetric cellulose acetate membrane of the same composition and source and prepared in substantially the same way as Membrane C of Example 10.

The permselective properties of these membranes were determined under the reverse osmosis conditions of Example 2. The membranes were then treated for about 3 hours with an aqueous solution containing 0.5% sodium chloride, 1% citric acid, 0.002% (20 ppm) tanic acid, and sufficient ammonium hydroxide to adjust the pH to 4 and the permselective properties of the membranes were again determined with the solution containing only 0.5% sodium chloride. The data in Table II show the reduction in salt passage through the membrane following the treatment.

TABLE II

| Membrane | Property | Before Treatment | After Treatment |
|---|---|---|---|
| H | water flux, g.s.f.d. | 5.0 | 3.8 |
| H | salt passage, % | 18.3 | 4.8 |
| I | water flux, g.s.f.d. | 9.0 | 8.0 |
| I | salt passage, % | 1.12 | 0.51 |
| J | water flux, g.s.f.d. | 10.2 | 9.6 |
| J | salt passage, % | 2.88 | 1.88 |

EXAMPLE 13

Asymmetric hollow fiber membranes of the same composition as the membranes of Example 1 were prepared substantially as described in Example 1. These membranes were held at 55°C. for 3 hours in water and then assembled into a reverse osmosis separation unit as decribed in Example 1. The permselective properties of these hollow fiber membranes were tested under the reverse osmosis conditions of Example 2. During the first day of tests the membranes were subjected to Treatment A in which they were exposed for about 0.5 hour at 400 p.s.i.g. to a solution containing 0.5% sodium chloride, 1% citric acid, and sufficient ammonium hydroxide to adjust the solution to pH 6.5 and then were exposed for about 2 hours at a pressure of 65 to 80 p.s.i.g. to a solution containing 0.5% sodium chloride, 1% citric acid, 0.002% (20 ppm) tannic acid, and sufficient ammonium hydroxide to adjust the solution to pH 6.5. During the second day of tests the membranes were subjected to Treatment B in which they were exposed for about 3 hours to a solution containing 0.5% sodium chloride, 1% citric acid and 0.002% (20 ppm) tannic acid at a pressure of about 400 p.s.i.g. The permselective properties of the membranes were determined with the solution containing only 0.5% sodium chloride between the treatments and periodically for 5 days following Treatment B. The data in Table III show the reduction in salt passage through the membranes following Treatment B and the lack of any significant reduction in salt passage through the membranes following Treatment A.

TABLE III

| Day | Time | Water Flux, g.s.f.d. | Salt Passage, percent |
|---|---|---|---|
| 1 | Before Treatment A | 2.08 | 9.0 |
|   | After Treatment A | 1.93 | 11.8 |
| 2 | Before Treatment B | 1.57 | 11.4 |
|   | After Treatment B | 1.73 | 1.76 |
| 3 |   | 1.54 | 1.33 |
| 6 |   | 1.50 | 1.05 |

EXAMPLE 14

Three portions of the asymmetric hollow fiber membranes of Example 13 were prepared by different techniques and then assembled in reverse osmosis separation units substantially as described in Example 1. Membrane K was heated for 3 hours at 55°C. in water and then kept wet with water until use. Membrane L was heated under the same conditions in an aqueous solution containing 0.1% tannic acid and sufficient sodium hydroxide to adjust the solution to pH 4. Membrane M was heated under the same conditions in a aqueous solution containing 0.1% tannic acid and sufficient sodium hydroxide to adjust the solution to pH 8.5. The permselective properties of these membranes were determined under the reverse osmosis conditions of Example 2. After overnight exposure to these reverse osmosis test conditions Membrane K had a water flux of 2.3 g.s.f.d. and a salt passage of 3.3%. Membrane L had a water flux of 2.2 g.s.f.d. and a salt passage of 0.49% and Membrane M had a water flux of 2.0 g.s.f.d. and a salt passage of 2.9%.

EXAMPLE 15

Asymmetric membranes N, O and P respectively of an aromatic polyamide containing sulfonic acid moieties, of an aromatic polyamide hydrazide, and of cellulose acetate and substantially equivalent to Membranes A and B of Example 10 and to Membrane I of Example 12 were prepared as described in those examples. Portions of these membranes were separately clamped in a metal-free apparatus in which an area of about 181 square centimeters of the more dense, more permselective sides of the membranes were treated overnight with aqueous solutions of hydrolyzable tannins and the less dense, less permselective sides of the membranes were exposed to aqueous solutions containing 0.5% sodium chloride. The permselective properties of the membranes were then determined under the reverse osmosis conditions of Example 1. Two treating solutions were used. Solution A contained 0.02% (200 ppm) tannic acid. Solution B contained 0.02% (200 ppm) tannic acid and 1% citric acid. A difference in osmotic pressure of about 60 psi tended to force water through the membranes from the more dense side toward the less dense side with the combination of Solution A and 0.5% sodium chloride solution. A difference in osmotic pressure for Solution B and the 0.5% sodium chloride solution was about 45 psi. The data in TAble IV show the greater reductions in salt passage through the membrane due to treatments with the more acidic solutions. During the treatment of Membrane O with the solution containing both tannic and citric acids the membrane removed 290 micrograms of tannic acid from the solution (16 micrograms per square centimeter). During the treatment of Membrane P with the same solution the membrane removed 1470 micrograms of tannic acid from the solution (81.2 micrograms per square centimeter).

After treatment of the more dense, more permeable side of Membrane O in the same apparatus with an aqueous solution containing 0.1% tannic acid with the less dense, less permselective side of the membrane in contact with an aqueous solution containing 0.5% sodium chloride, the salt passage through the membrane under the above-described reverse osmosis conditions was 2.6%. Another portion of the membrane exposed only to the 0.5% sodium chloride solutions on both sides had a salt passage under the same conditions of 3.3%. Similarly a portion of Membrane O treated in the same apparatus with an aqueous solution containing only 0.1% (1000 ppm) tannic acid with the less dense side of the membrane in contact with water had a salt passage of 2.9%.

membrane is treated with a solution of hydrolyzable tannin at a pressure of at least 100 pounds per square

TABLE IV

| Membrane | Property | Solution B: Tannic and Citric Acids | | | Solution A: Tannic Acid | | |
|---|---|---|---|---|---|---|---|
| | | Untreated 2–5 Days | Treated 1 Day | Treated 2–5 Days | Untreated 2–5 Days | Treated 1 Day | Treated 2–5 Days |
| N | water flux g.s.f.d. | 11.0 | 11.7 | 12.4 | 12.4 | 11.9 | 12.3 |
| N | salt passage, % | 1.0 | 0.6 | 0.4 | 0.6 | 1.7 | 0.9 |
| O | water flux, g.s.f.d. | 18.4 | 15.1 | 17.4 | 19.1 | 15.6 | 17.1 |
| O | salt passage, % | 1.4 | 0.9 | 0.9 | 1.4 | 1.3 | 1.2 |
| P | water flux, g.s.f.d. | 20.5 | 18.6 | 18.8 | 18.1 | 16.4 | 17.4 |
| P | salt passage, % | 3.1 | 1.8 | 3.7 | 2.6 | 2.1 | 2.8 |

The embodiments of the invention in which an exclusive property or priviledge is claimed are defined as follows:

1. A process for separating solvent from an aqueous mixture containing a solute other than aqueous tanning extracts, comprising contacting a nonporous semipermeable membrane selected from
   a. A cellulose acetate polymer of the general formula:

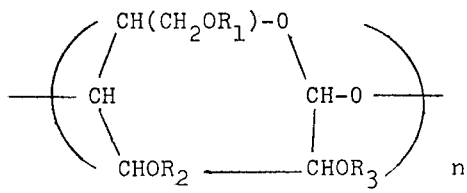

wherein $R_1$, $R_2$ and $R_3$ are the same or different and are hydrogen, alkyl of one to eight carbon atoms or $CR_4O$ wherein $R_4$ is alkyl of one to seven carbon atoms, and $n$ is an integer sufficiently large to provide film forming weight,
   b. Sulfonated poly(phenylene ether), and
   c. Sulfonated poly(arylene ether sulfone) with said mixture under permselective separation conditions, said membrane having been treated with a solution of a hydrolyzable tannin in an amount and under conditions which result in an initial reduction in solute passage through the membrane of at least 10%.

2. The process of claim 1 wherein the aqueous mixture contains at least one inorganic salt and the membrane is contacted with the mixture at an applied pressure greater than the osmotic pressure of the mixture.

3. The process of claim 1 wherein the reduction in salt passage is at least 50%.

4. The process of claim 1 wherein the semipermeable membrane is treated with a solution of hydrolyzable tannin at a pH of about 1.5 to about 6.0 and a temperature of between about 0°C. and about 100°C. for from about 30 seconds to several days, the concentration of tannin in said solution being at least 2 parts per million.

5. The process of claim 4 wherein the semipermeable membrane is treated with a solution of hydrolyzable tannin at a pressure of at least 100 pounds per square inch.

6. The process of claim 4 wherein the semipermeable membrane is treated with a solution of hydrolyzable tannin at a pH of about 2.0 to about 5.0.

7. The process of claim 6 wherein the solution of hydrolyzable tannin contains between about 0.1 and about 2 weight percent of citric acid.

8. The process of claim 6 wherein the semipermeable membrane is treated with a solution of hydrolyzable tannin at a pressure of at least 100 pounds per square inch and a temperature between about 10°C. and about 90°C. for from about 2 minutes to about 24 hours, the concentration of tannin in said solution being at least 10 parts per million.

9. The process of claim 1 wherein the semipermeable membrane is asymmetric in structure.

10. The process of claim 9 wherein the semipermeable membrane is treated on its more permselective side with a solution of hydrolyzable tannin at a pH of from about 1.5 to about 6, a temperature of from about 0°C. to about 100°C., and a pressure of at least 100 pounds per square inch for from about one second to several days, the concentration of tannin in said solution being at least 2 parts per million.

11. The process of claim 9 wherein the semipermeable membrane is treated with a solution of hydrolyzable tannin at a pH between 2 and 4, a temperature between 20°C. and 40°C., and a pressure of at least 250 pounds per square inch for from 2 minutes to about 5 hours, the concentration of tannin in said solution being between about 20 parts per million and about 2 percent.

12. The process of claim 1 wherein the membrane is composed essentially of a linear aromatic synthetic polymer containing between about 0.1 and about 5 sulfonic acid moieties per 1,000 grams of dry polymer.

13. A process for separating solvent from an aqueous mixture containing a solute other than aqueous tanning extracts, comprising contacting a non-porous semipermeable membrane with said mixture under permselective separation conditions, said membrane having been treated with a solution of a hydrolyzable tannin in an amount and under conditions which result in an initial reduction in solute passage through the membrane of at least 10%, wherein the semipermeable membrane is a cellulose acetate polymer of the general formula

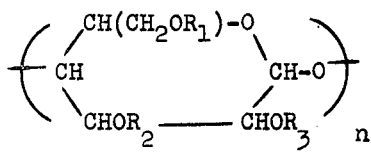

wherein $R_1$, $R_2$ and $R_3$ are the same or different and are hydrogen, alkyl of one to eight carbon atoms or $CR_4O$ wherein $R_4$ is alkyl of one to seven carbon atoms, and n is an integer sufficiently large to provide film forming weight.

14. The process of claim 13 wherein the membrane is treated with a solution of hydrolyzable tannin at pH of about 2 to 4, at a temperature of between about 20°C. and about 90°C., and for from about 2 minutes to about 24 hours, the concentration of tannin in said solution being at least 10 parts per million.

15. A process for separating solvent from an aqueous mixture containing a solute other than aqueous tanning extracts, comprising contacting a non-porous semipermeable membrane consisting essentially of sulfonated poly(arylene ether sulfone) with said mixture under permselective separation conditions, said membrane having been treated with a solution of a hydrolyzable tannin in an amount and under conditions which result in an initial reduction in solute passage through the membrane of at least 10%.

16. A process for separating solvent from an aqueous mixture containing a solute other than aqueous tanning extracts, comprising contacting a non-porous semipermeable membrane consisting essentially of sulfonated poly(phenylene ether) with said mixture under permselective separation conditions, said membrane having been treated with a solution of a hydrolyzable tannin in an amount and under conditions which result in an initial reduction in solute passage through the membrane of at least 10%.

* * * * *